(12) United States Patent
Tipton et al.

(10) Patent No.: US 7,721,300 B2
(45) Date of Patent: May 18, 2010

(54) METHODS AND SYSTEMS FOR MANAGING A NETWORK

(75) Inventors: Daniel Eugene Tipton, Petersburg, NY (US); Anantha Lakshmi Gangaraju, Andhra Pradesh (IN); Ramesh Pusala, Sainikpuri (IN)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 1756 days.

(21) Appl. No.: 10/752,853

(22) Filed: Jan. 7, 2004

(65) Prior Publication Data

US 2005/0149949 A1    Jul. 7, 2005

(51) Int. Cl.
G06F 3/00        (2006.01)
G06F 15/173    (2006.01)
G06F 3/12        (2006.01)

(52) U.S. Cl. .................. 719/321; 709/225; 358/1.1
(58) Field of Classification Search .............. 719/310, 719/321; 358/1.1, 400; 709/225
See application file for complete search history.

(56) References Cited

U.S. PATENT DOCUMENTS

| | | | |
|---|---|---|---|
| 4,570,217 A | | 2/1986 | Allen et al. |
| 5,970,224 A * | 10/1999 | Salgado et al. ............. 358/1.16 |
| 6,240,456 B1 * | 5/2001 | Teng et al. .................. 709/230 |
| 6,396,594 B1 * | 5/2002 | French et al. .............. 358/1.18 |
| 6,959,416 B2 * | 10/2005 | Manning et al. ............ 715/227 |
| 7,139,085 B1 * | 11/2006 | Sakaguchi .................. 358/1.15 |
| 2002/0035495 A1 | 3/2002 | Spira et al. |
| 2002/0138558 A1 * | 9/2002 | Ferlitsch ..................... 709/203 |
| 2002/0171864 A1 * | 11/2002 | Sesek ......................... 358/1.15 |
| 2002/0181476 A1 | 12/2002 | Badamo et al. |
| 2002/0188486 A1 | 12/2002 | Gil et al. |
| 2002/0188513 A1 | 12/2002 | Gil et al. |
| 2002/0191954 A1 | 12/2002 | Beach et al. |
| 2002/0194319 A1 | 12/2002 | Ritche |
| 2002/0194601 A1 | 12/2002 | Perkes et al. |
| 2004/0136028 A1 * | 7/2004 | Rabb ........................ 358/1.15 |
| 2005/0222891 A1 * | 10/2005 | Chan et al. ..................... 705/9 |

FOREIGN PATENT DOCUMENTS

WO        WO 01/71607 A1    9/2001

* cited by examiner

*Primary Examiner*—Lechi Truong
(74) *Attorney, Agent, or Firm*—Mark A. Conklin, Esq.; Armstrong Teasdale LLP

(57) ABSTRACT

A system and method for managing a plurality of devices is provided. The system includes a user interface for controlling a plurality of devices configured as a network. The plurality of devices have corresponding device drivers to configure each of the plurality of devices to allow queuing operations to be performed in connection with the plurality of devices. The user interface is configured to communicate with the plurality of devices to identify and control jobs in a queue relating to each of the devices. The system also includes a monitoring system for monitoring the plurality of devices. The monitoring system is configured to provide notification to the user interface when a predetermined queue limit for at least one of the plurality of devices is exceeded.

18 Claims, 17 Drawing Sheets ical embodiment of the present invention.

METHODS AND SYSTEMS FOR MANAGING A NETWORK

BACKGROUND OF THE INVENTION

This invention relates generally to network monitoring and management systems and, more particularly, to methods and systems for monitoring and managing devices in a network.

Network based systems often require management of different devices operating at the same time. This management typically includes monitoring and controlling many different types of devices interconnected within the network. These devices may have different communication protocols and require different device drivers to properly control operation of each of the devices. The monitoring and control of these devices often requires complex systems having many interfaces with the complexity increasing as the number of devices being controlled increases.

For a network having a very large number of different devices, many different interfaces for controlling and monitoring the devices having different protocol and driver requirements is often required, thereby resulting in a system that is tedious to manage and operate. Thus, the administrative and accounting costs for managing the network monitoring and control of these devices, including managing the data traffic flow, is often high, and increases rapidly as the number of devices on the network increases. For example, in a large production facility where production data is communicated between various different devices (e.g., operator interface devices, marquees, printers, etc.), the amount of time and cost to manage the various devices can be high because of the different requirements for each of the devices.

BRIEF DESCRIPTION OF THE INVENTION

In one exemplary aspect, a management system for managing a plurality of devices is provided. The management system includes a user interface for controlling a plurality of devices configured as a network. The plurality of devices have corresponding device drivers to configure each of the plurality of devices to allow queuing operations to be performed in connection with the plurality of devices. The user interface is configured to communicate with the plurality of devices to identify and control jobs in a queue relating to each of the devices. The management system also includes a monitoring system for monitoring the plurality of devices. The monitoring system is configured to provide notification to the user interface when a predetermined queue limit for at least one of the plurality of devices is exceeded.

In another exemplary aspect, a method for managing a plurality of devices within a network is provided. The method includes interfacing with a plurality of devices using corresponding device drivers to configure each of the plurality of devices to allow queuing operations to be performed in connection with the plurality of devices. The method further includes accessing each of the plurality of devices to determine whether a job queue limit is exceeded and providing notification when a job queue limit is exceeded.

DETAILED DESCRIPTION OF THE INVENTION

Exemplary embodiments of systems and processes that facilitate network management of a plurality of devices are described below in detail. A technical effect of the management systems and processes described herein include at least one of facilitating monitoring and control of devices within a network, broadcasting control commands to the devices using a single interface, and configuring data to be monitored for the different devices. The management systems and processes include a user interface that allows for monitoring and controlling a plurality of devices in a network to perform, for example, device and queue operations for each of the devices.

Figure 1:
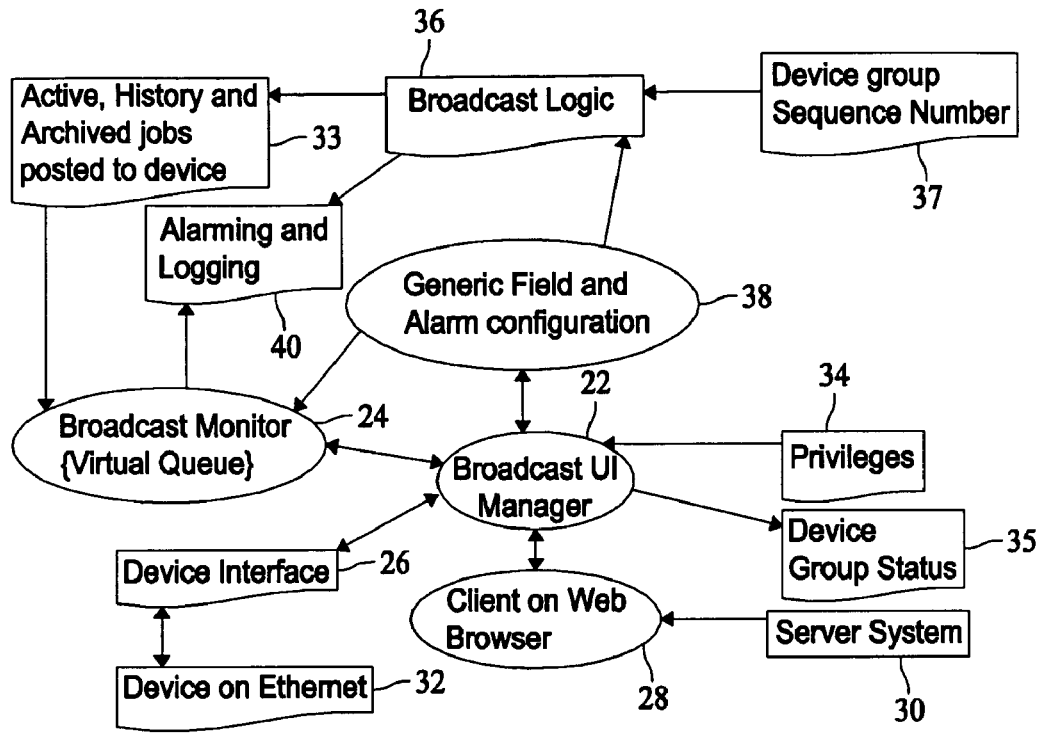
FIG. 1 is a block diagram of a management system in accordance with an exemplary embodiment of the present invention.

FIG. 1 is a block diagram of an exemplary embodiment of a management system 20. The management system 20 generally includes a broadcast user interface manager 22, a broadcast monitor 24 and a device interface 26. The broadcast user interface manager 22 communicates with one or more client subsystems 28, for example, computers including a web browser, such that a server system 30 is accessible to the client subsystems 28 via the Internet. The client subsystems 28 may be interconnected to the Internet, for example, via different interfaces including a network such as a local area network (LAN), wide area network (WAN), dial-in-connections, cable modems or ISDN lines. The client subsystems 28 may be any device capable of interconnecting to the Internet, such as a computer, personal digital assistant (PDA) or other web-based connectable equipment.

The broadcast user interface manager 22, in one exemplary embodiment, is a communications interface that communicates with one or more device interfaces 26 that interface with devices 32 on the network (e.g., operator interface device or printer on an Ethernet) to determine, for example, the different available devices on the network and the operations being performed by each of these devices. The one or more device interfaces 26 allow the broadcast user interface manager 22 to communicate with devices 32 having different communication protocols and driver requirements. The broadcast system 36 places jobs in a spool location 33 (e.g., specific addressable location within a storage disk to which active, history or archived jobs are posted to a device 32 and defining a virtual queue) as configured by a user. The broadcast monitor 24 operates as a virtual queue manager for a device group as described herein, with jobs determined based upon a device group sequence number 37, and controls the broadcast user interface manager 22, and in particular, provides requests to the broadcast user interface manager 22 to post jobs to a device 32 via the device interface 26. For example, in one embodiment, the device interfaces 26 are device drivers for each of the devices 32, with the broadcast system providing the appropriate control commands for each of the devices (e.g., API calls for a particular device 32). In this exemplary embodiment, the broadcast user interface manager 22 supports devices 32 having device interfaces 26, such as drivers (e.g., device specific drivers from the manufacturer of the device 32), that enable configuration and communication with that device 32, for example using a particular operating system including, but not limited to Windows®, Windows XP®, Linux®, VMS®, OS/400®, AIX®, and z/OS®. Using the device interfaces 26 specific to each device 32, queuing operations on these devices 32 as described herein may be performed using spooler APIs.

The broadcast user interface manager 22 interfaces with the configured devices 32 using an operating system specific driver for each device 32 (e.g., Windows® printer driver). The broadcast user interface manager 22 also may perform control functions, such as accessing a privileges database 34 to determine the specific control operations available to a particular user or accessing a device group status file or database 35 to determine the status of a device 32 or group of devices 32.

The broadcast monitor 24 receives information from one or more device interfaces 26 relating to each of the devices 32 (e.g., number of jobs in a queue), and based upon user defined parameters, such as field configuration and alarm configuration information from a configuration database 38, provides notification, such as a visible or audible alarm 40 when the user defined parameters are exceeded. The broadcast monitor 24 may provide notification functionality based upon monitoring of, for example, active device queues (e.g., jobs currently being performed by a device 32) and/or history queues (e.g., jobs previously performed by a device 32).

Figure 2:
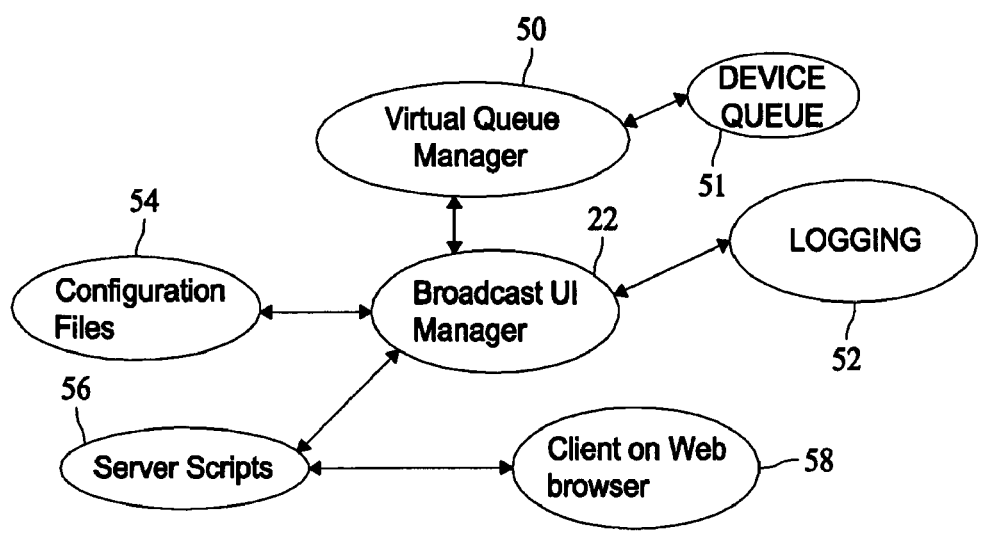
FIG. 2 is a block diagram showing a broadcast user interface manager of the management system of FIG. 1.

Referring now to an exemplary embodiment of the broadcast user interface manager 22, and as shown in FIG. 2, the broadcast user interface manager 22 receives information from a plurality of sources to control a plurality of devices 32 within a system or network and provide information (e.g., display status information) to a user. For example, the broadcast user interface manager 22 may receive information from a virtual queue manager 50 for a particular device 32 (shown in FIG. 1) indicating the number of jobs currently in a queue and the status of each of the jobs. The virtual queue manager 50 interfaces with a device queue 51 using logging information 52 (e.g., logging success or failure notifications of a broadcast to certain devices 32 along with a time stamp and an error message, if any). The logging information 52 may be used, for example, in determining whether a particular device 32 is available for operation and the functions available to the user, which may be based upon privilege information (e.g., permission to cancel or delete a job) in the privileges database 34 (shown in FIG. 1). Configuration information or files 54 selected or accessed via the broadcast user interface manager 22 may be used to set parameters for use by the broadcast monitor 24 (shown in FIG. 1) to determine when a notification should be provided (e.g., provide an alarm that a job queue limit has been exceeded). The broadcast user interface manager 22 also communicates with the client subsystem 28, including user or network devices running those devices via server scripts 56 operating within a web browser 58, for example, to receive user inputs. Thus, in an exemplary embodiment, the broadcast user interface manager 22 is configured as a web-based system allowing for local or remote access to manage a plurality of devices within a network.

The architecture of the management system 20 as well as the various components is exemplary only. Other architectures are possible and may be utilized in connection with practicing the processes and interfacing with users as described below.

Figure 3:
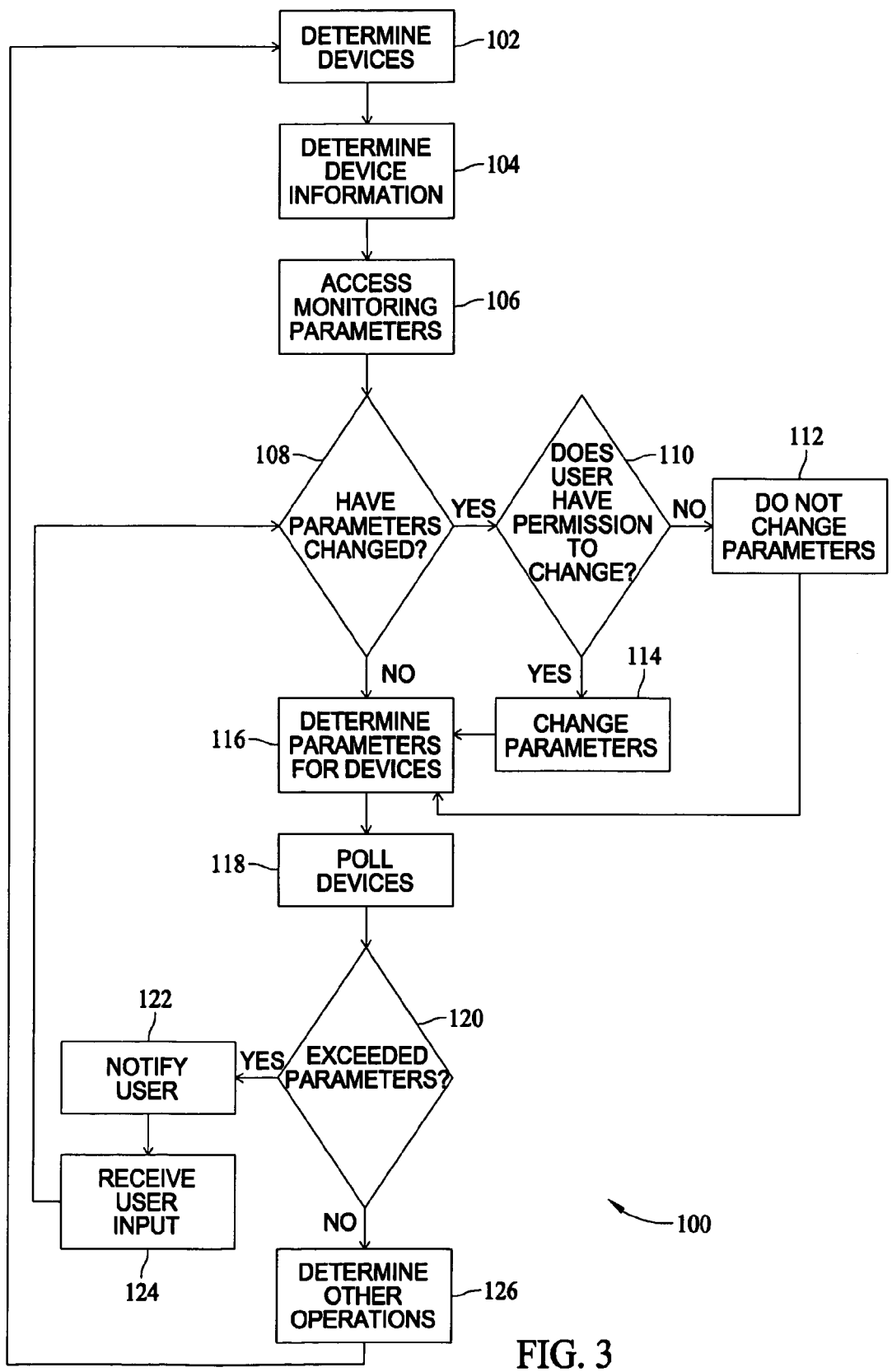
FIG. 3 is a flowchart of the processes employed by the management system of FIG. 1.

FIG. 3 is a flowchart 100 illustrating exemplary processes utilized by the management system 20. The technical effect of the management system 20 is achieved by determining the devices (e.g., network devices) configured on a system (e.g., server) at 102. Specifically, the one or more device interfaces 26 (shown in FIG. 1), which may include a plurality of different device drivers corresponding to each of the devices 32 (shown in FIG. 1), communicate with the devices 32 based upon control commands from the broadcast system 36 as is known and as may be required by each of the devices 32. For example, a user can define device specific control sequences in an ASCII form, with the control sequences interpreted by the device drivers and corresponding operations performed. The broadcast user interface manager 22 identifies the available devices 32 in the network using the one or more device interfaces 26. Device information is then determined at 104. Such information, may include, for example, the type of device 32, the operations available, the configuration of the device 32, the settings of the device 32, the status of the device 32, including, for example, the status of jobs (e.g., print jobs) within queues of the device 32, among others. Monitoring parameters as set by a user and described in more detail below are accessed (e.g., access the configuration database 38, shown in FIG. 1) at 106. In an exemplary embodiment, these monitoring parameters include threshold values for the queues (e.g., active and archive queues) for each of the devices 32 that define a maximum or threshold number of jobs for that device 32.

A determination is then made at 108 as to whether the monitoring parameters have changed. For example, a determination is made as to whether a user has attempted to change the threshold values. If the monitoring parameters have changed, then at 110, a determination is made as to whether the user has permission to change the monitoring parameters.

It should be noted that this determination might also include identifying other attempted changes, for example, whether a user has attempted to delete or remove a job from a queue within a device 32. If the user does not have permission to change the monitoring parameters, then at 112 the parameters are not changed and the current monitoring parameters are maintained in the configuration database 38. If at 110 a determination is made that the user has permission to change the monitoring parameters, then at 114 the parameters are changed (e.g., threshold values changed) and the new monitoring parameter values are stored within the configuration database 38. Thereafter, or if at 108 a determination is made that the monitoring parameters have not changed, the monitoring parameters, which in an exemplary embodiment are job queue limit values, are determined at 116 for each of the devices 32. This may be provided in various different manners, such as, for example, using a look-up table as part of the configuration database 38.

After the monitoring parameters for each of the devices 32 are determined, the devices 32 are polled at 118 to determine the current condition (e.g., operating value, number of jobs in the queue, etc.) of the monitoring parameters for each of the devices 32. This may include determining, for example, the number of jobs in various queues within the device 32. At 120 a determination is made as to whether any of the monitoring parameters for each of devices 32 has been exceeded (e.g., threshold value exceeded). If a monitoring parameter has been exceeded, then at 122 a notification is provided, for example, a visual alarm notification is displayed. This notification allows a user, for example, to take appropriate action (e.g., redirect jobs to another device 32 or terminate one or more jobs in a queue) as needed or desired. It should be noted that in this exemplary embodiment the notification does not cause the termination of jobs in the queue. However, jobs may be terminated, for example, if the queue is full and/or there is not enough space (e.g., disk space) for additional jobs. Thereafter, a user input may be received at 124. This user input may include, for example, modifying, such as resetting or increasing the limit for the monitoring parameter exceeded, modifying the operation of the device 32 having the exceeded monitoring parameter (e.g., canceling, terminating or redirecting one or more jobs), overriding the notification, halting operation of the device 32 until action is taken, causing the automatic redirection, archiving or halting of further jobs from being accepted by the device 32, among others. Thereafter a determination is again made at 108 as to whether the monitoring parameters have changed.

If the monitoring parameter has not been exceeded as determined at 120, then at 126, a determination is made as to whether other operations are required. For example, a user search for specific jobs may be required, in which case the broadcast user interface manager 22 communicates with the devices 32 using the device interface 26 to determine the required information.

A user must register with the management system 20 before being granted permission to access the various user interfaces described below. The specific user interfaces accessible by a particular user or the particular functionality available from each of the user interfaces may be determined based upon the privileges of the user as described herein. The user interfaces described below are exemplary embodiments included within the management system 20, and in particular, user interfaces within the broadcast user interface manager 22 of the management system 20 that enable a user to access and manage devices 32 within a network.

Figure 4:
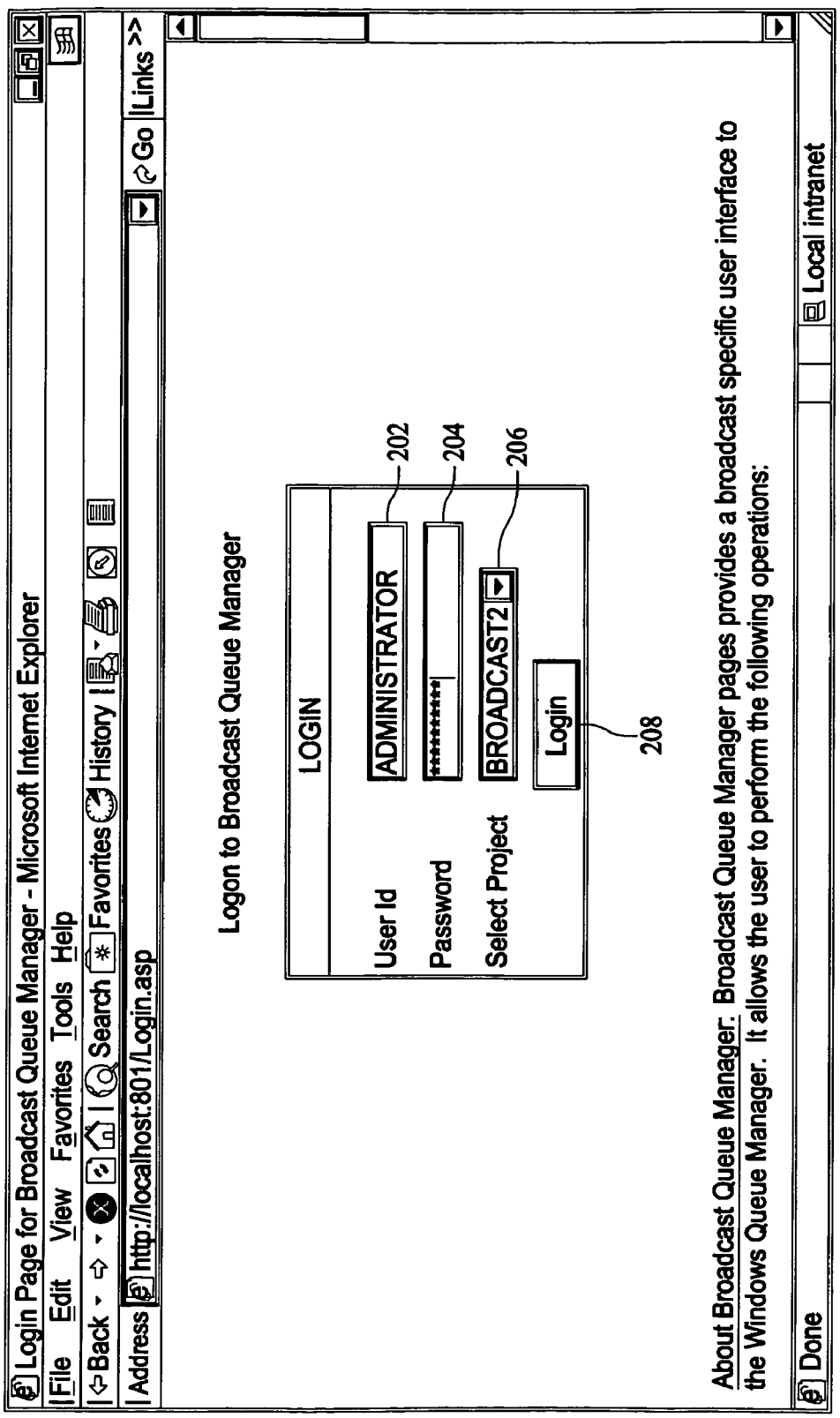
FIG. 4 is an exemplary embodiment of a user interface displaying a login page within a broadcast user interface manager of the management system.

FIG. 4 is an exemplary embodiment of a user interface 200 displaying a login page within the management system 20 (shown in FIG. 1). The user interface 200 includes a User Id field 202 for entering a user identification (e.g., user name), a Password field 204 for entering a user password and a Select Project field 206 for selecting access options, for example, devices 32 (shown in FIG. 1) associated with a particular project, job or portion of the network (e.g., devices 32 relating to particular tasks to be performed on an assembly line). The Select Project field 206 is optional and may be left blank. Although the Select Project field 206 is shown as a pull-down menu, it may be modified to allow, for example, for user input of a new storage location where jobs are stored. A user then selects a Login selection member 208 (e.g., clicks on a Login button on a computer screen) to access the management system 20. The user interface 200 is the entry point for users accessing the management system 20. Once a valid user name and password are entered, a user is given access to the various user interfaces described below. It should be noted that although buttons and data fields are shown in the exemplary embodiments described herein, lists, check boxes and other means for entering and/or inputting information may be used.

Figure 5:
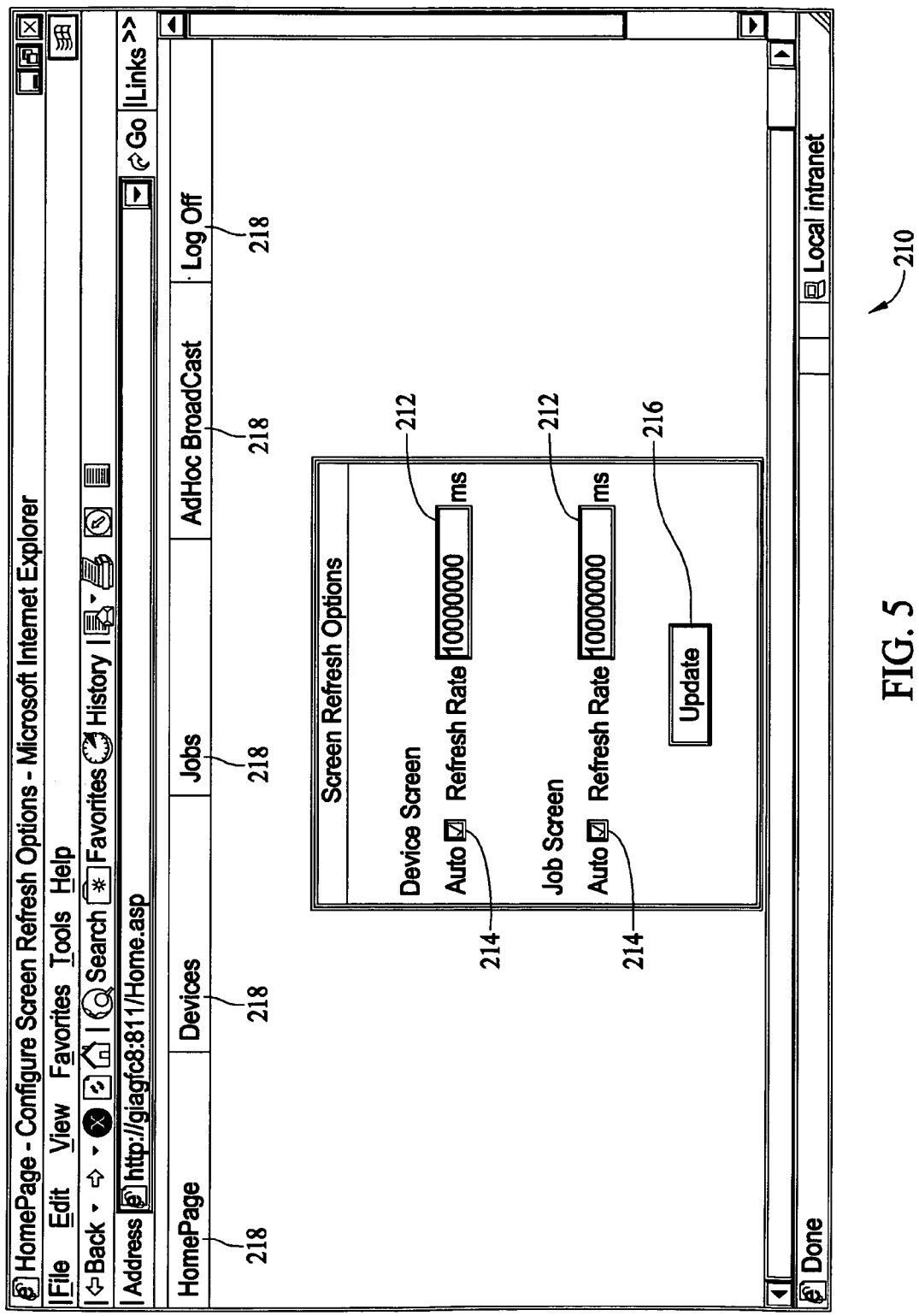
FIG. 5 is an exemplary embodiment of a user interface displaying a page within a broadcast user interface manager of the management system to configure screen refresh options.

FIG. 5 is an exemplary embodiment of a user interface 210 displaying a page within the management system 20 (shown in FIG. 1) that may be used, for example, to configure screen refresh options. As shown, and for example, different options, such as a display or screen refresh rate may be selected. For example, Refresh Rate fields 212 allow for entering a screen refresh rate for a device screen (e.g., when information regarding a device 32 is being displayed) and for a job screen (e.g., when information regarding one or more devices 32 relating to a job is being displayed). A user may also select whether the screen refreshing occurs automatically by selecting an Auto check box 214. Selecting an Update selection member 216 will update the rate at which the screens are refreshed based upon the values entered in the Refresh Rate fields 212.

In an exemplary embodiment, all user interfaces as described herein, including, for example, the user interface 210, also include menu selection members 218 allowing a user to access additional options and screens of the various embodiments of the management system 20. For example, HomePage, Devices, Jobs, AdHoc BroadCast and Log Off menu selection members 218 may be provided.

Figure 6:
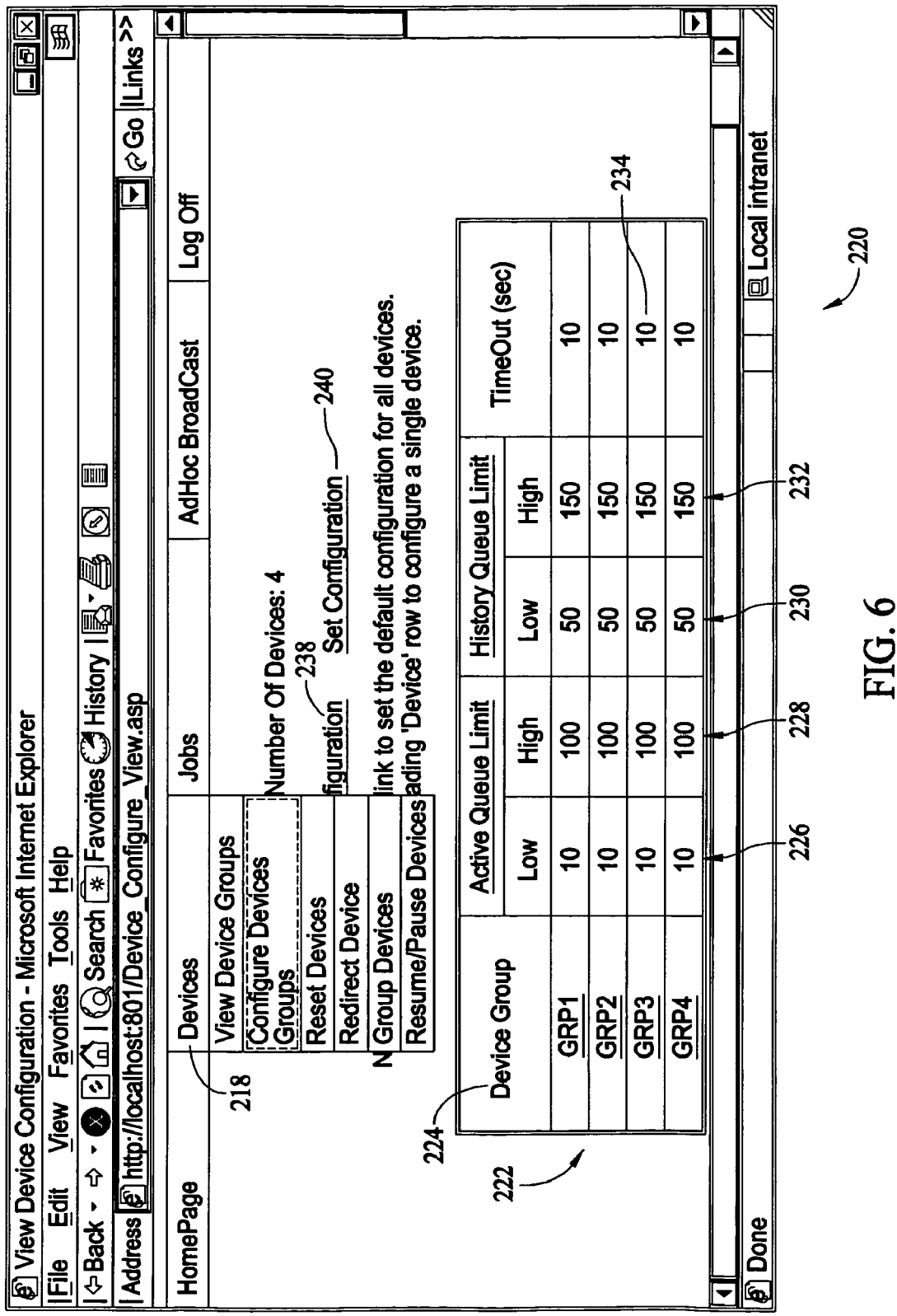
FIG. 6 is an exemplary embodiment of a user interface displaying a configure device groups page within a broadcast user interface manager of the management system.

FIG. 6 is an exemplary embodiment of a user interface 220 displaying a configure device groups page within the management system 20 (shown in FIG. 1). The user interface 220 is displayed upon selection of a Configure Devices Groups option from a drop down menu. The drop down menu is displayed upon selection of the Devices menu selection member 218. The user interface 220 includes a configuration portion 222 (e.g., user selectable table) allowing for configuring the queues of different devices 32 (shown in FIG. 1), which may be configured as different device groups. Specifically, in an exemplary embodiment, the configuration portion 222 includes a Device Group column 224 showing the available device groups that are configured; an Active Queue Limit (Low) column 226 and an Active Queue Limit (High) column 228 displaying and for use in setting queue limits (e.g., job warning levels) for active jobs (e.g., jobs being or to be performed) of the device groups shown in the Device Group column 224; a History Queue Limit (Low) column 230 and a History Queue Limit (High) column 232 displaying and for use in setting queue limits for history jobs (e.g., jobs already performed) of the device groups shown in the Device Group column 224; and a Time Out column 234 for setting a time out value (e.g., an alarm or notification will be provided if the top or first job stays in the device queue longer than a configured time out period) for each of the device groups shown in the Device Group column 224.

A user may select a particular device group in the Device Group column 224 (e.g., click on the device group name) to configure that device group (e.g., set or change a particular queue limit), such that, for example, when the queue limit is exceeded, the management system 20 provides notification as described herein. A Clear Configuration selection member 238, when selected, clears all the queue limits and a Set Configuration selection member 240 allows for setting a common value for all the queues. It should be noted that other user interfaces may be selected from the drop down menu including, for example, View Device Groups to view the job queues of the various devices 32 (shown in FIG. 1), Reset Devices to reset the various devices 32, Redirect Devices to redirect jobs between devices 32 and Group Devices to group devices 32, for example, relating to a particular job. These user interfaces are similar to the user interface 220, but provide different functionality as described herein.

Figure 7:
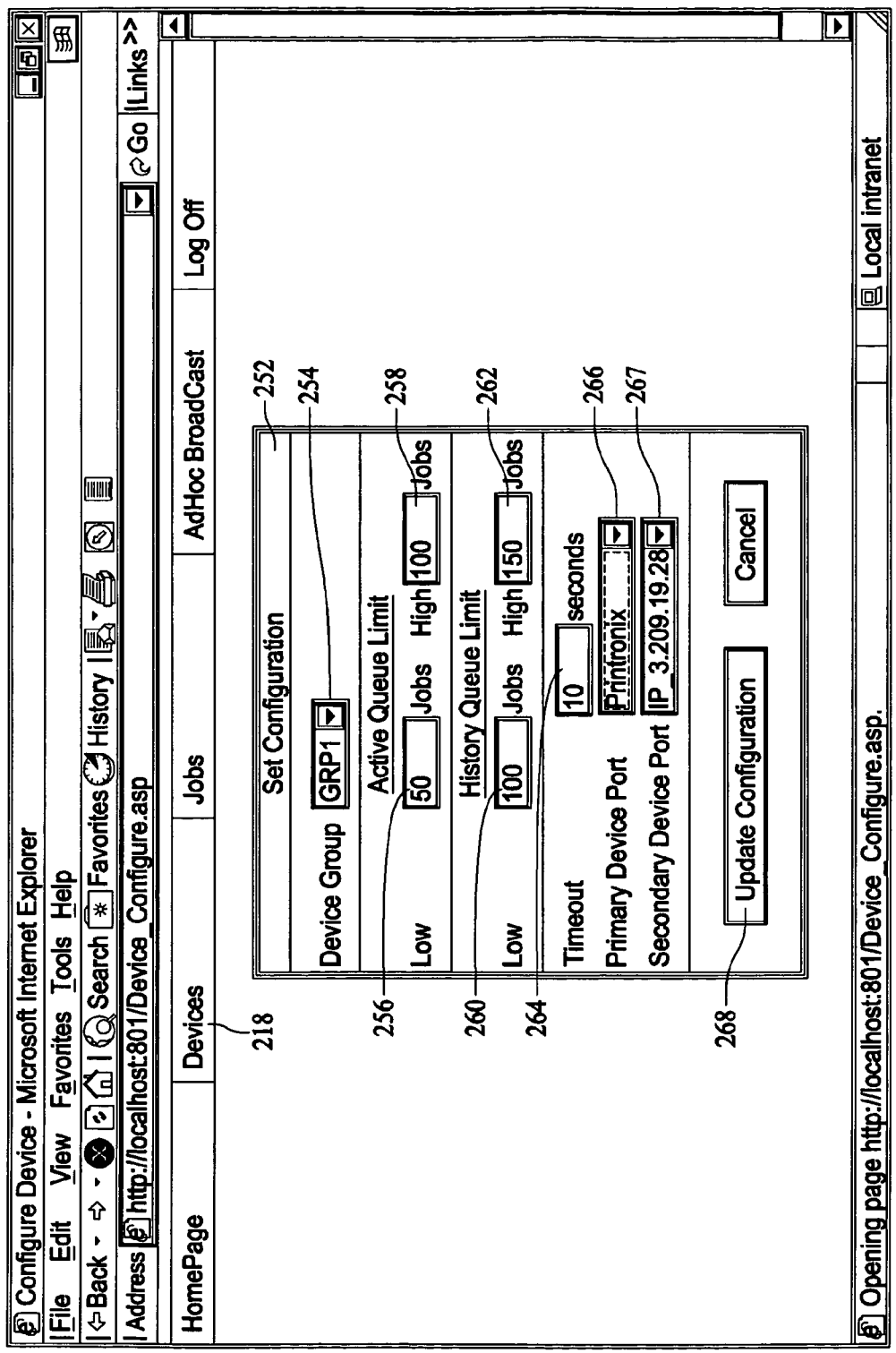
FIG. 7 is an exemplary embodiment of a user interface displaying a configure queue monitor page within a broadcast user interface manager of the management system.

Upon selecting a specific device name in the Device Group column 224, a configure queue monitor is displayed. FIG. 7 is an exemplary embodiment of a user interface 250 displaying a configure queue monitor page within the management system 20 (shown in FIG. 1). The user interface 250 includes a set configuration portion 252 for setting the queue limits for a device group, which includes one or more devices 32 (shown in FIG. 1). The set configuration portion 252 includes a Device Group Name field 254 showing the device group selected in the Device Group column 224 of the user interface 220 (shown in FIG. 6) to be configured. It should be noted that in an exemplary embodiment, the Device Group Name field 254 includes a pull-down list for selecting another device group. An Active Queue Limit (Low) field 256 and an Active Queue Limit (High) field 258 allow for setting the low and high limits for active jobs in the queue for the device group selected in the Device Group Name field 254. As described herein, when the limit is exceeded, a notification is provided to the user. A History Queue Limit (Low) field 260 and a History Queue Limit (High) field allow for setting the low and high limits for history jobs in the queue for the device group selected in the Device Group Name field 254. A Time Out field 264 allows for setting a time out value (e.g., time after which if a job stays in device queue 51 (shown in FIG. 2) an alarm or notification will be provided) for the devices 32 that are part of the device group selected in the Device Group Name field 254. A Primary Device Port field 266 and a Secondary Device Port field 267 allow for viewing or selecting another address (e.g., selecting a port address from a pull-down menu) for the primary and secondary devices 32 configured in the device group selected in the Device Group Name field 254. The primary and secondary addresses for the devices 32 selected in the Device Group Name field 254 is initially shown in the Primary Device Port field 266 and Secondary Device Port field 267, respectively. An Update Configuration selection member 268 is selectable by a user to update the configuration information for the device group selected in the Device Group Name field 254 based upon the information entered in the configuration portion 252.

Figure 8:
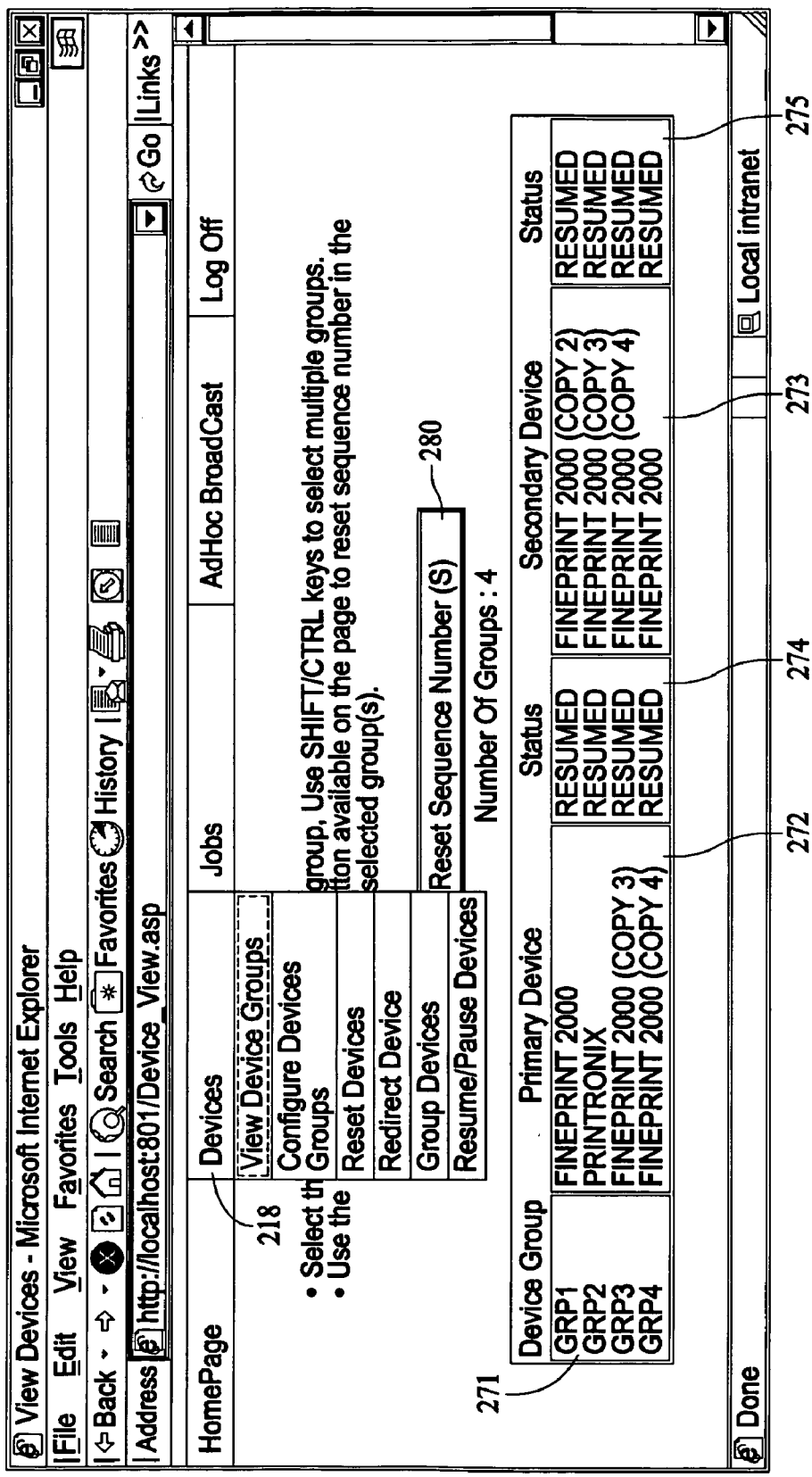
FIG. 8 is an exemplary embodiment of a user interface displaying a device status page within a broadcast user interface manager of the management system.

Information regarding the device groups being monitored may be viewed upon selecting the View Device Groups option from a drop down menu. The drop down menu is displayed upon selection of the Devices menu selection member 218. A user interface 270 is displayed upon selection of the View Device Groups option from the drop down menu. FIG. 8 is an exemplary embodiment of a user interface 270 displaying a device status page within the management system 20 (shown in FIG. 1). The user interface 270 includes a Device Group column 271, a Primary Device column 272, a Primary Device Status column 274, a Secondary Device Column 273 and a Secondary Device Status column 275 with the Status columns 274 and 275 showing the status (e.g., paused, resumed, active, etc.) of each device 32 (shown in FIG. 1) listed in the Primary Device column 272 and Secondary Device column 273, respectively. It should be noted that if more devices 32 than can be displayed on one screen are present, a scroll bar or other suitable member for scrolling through the devices 32 is provided. A Reset Sequence Number selection member 280 is also provided. In one exemplary embodiment, a sequence number corresponds to a physical form (e.g., form to be filled out before a car proceeds along an assembly line). By selecting the Reset Sequence Number selection member 280, information relating to particular device group is reset. In one exemplary embodiment, a sequence number is generated for a device group if a sequence number field is used in the broadcast form sent to the device group. For every broadcast using this field in the form, the sequence number is incremented by one. The sequence number for a device group may be reset to zero by selecting the Reset Sequence Number selection member 280.

Figure 17:
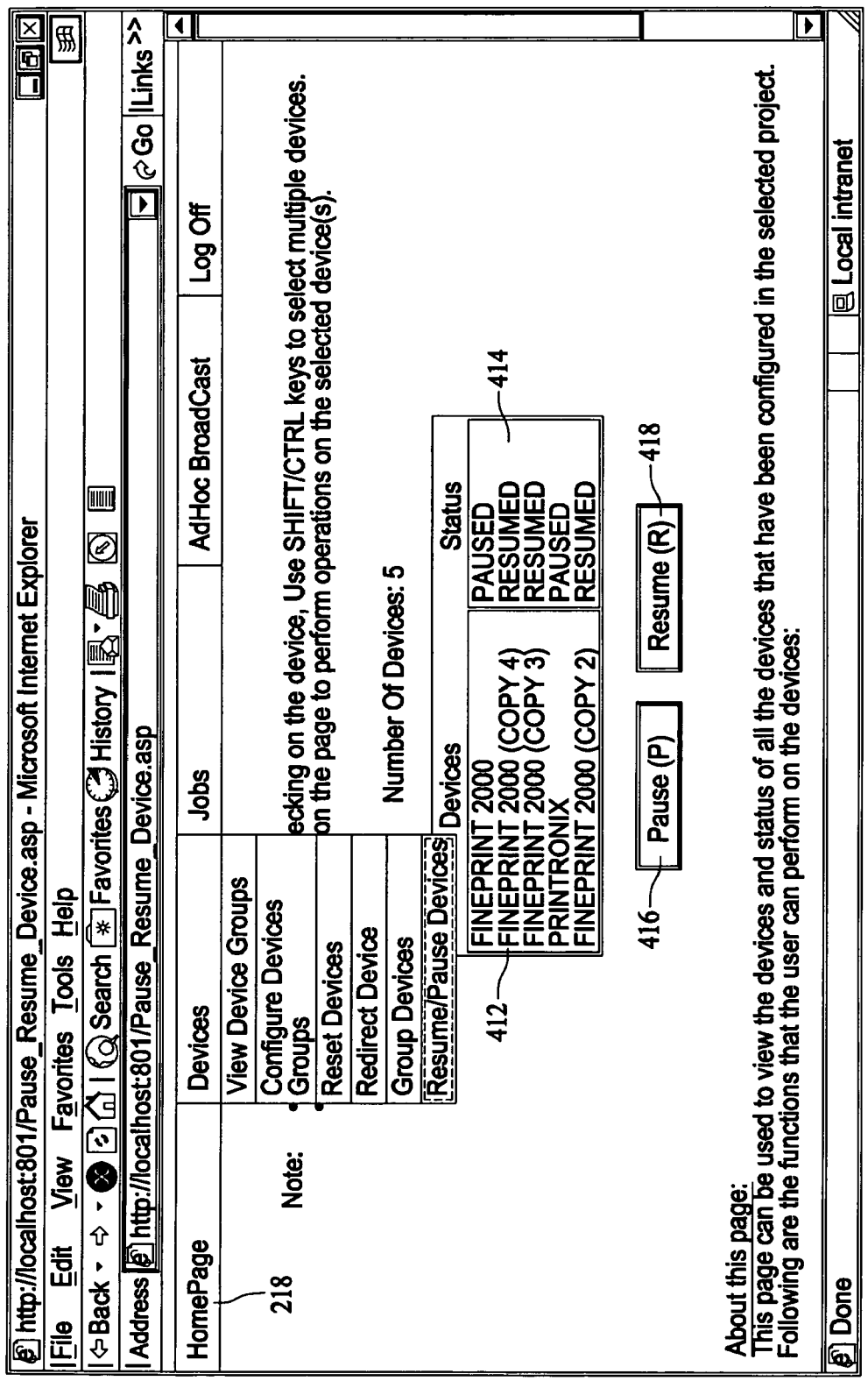
FIG. 17 is an exemplary embodiment of a user interface displaying a device control page within a broadcast user interface manager of the management system.

A device 32 may be paused or resumed upon selecting the Resume/Pause Devices option from a drop down menu. The drop down menu is displayed upon selection of the Devices menu selection member 218. A user interface 410 is displayed upon selection of the Resume/Pause Devices option from the drop down menu. FIG. 17 is an exemplary embodiment of a user interface 410 displaying a device control page for pausing and resuming devices 32 within the management system 20 (shown in FIG. 1). The user interface 410 includes a Devices column 412 showing the available devices 32 and a Status column 414 showing the status of each of devices 32 in the Devices column 412. The user interface 410 also includes a Pause selection member 416 to pause an active device 32 selected (e.g., highlighted) in the Devices column 412 and a Resume selection member 418 to resume a paused device 32 selected (e.g., highlighted) in the Devices column 412.

Figure 9:
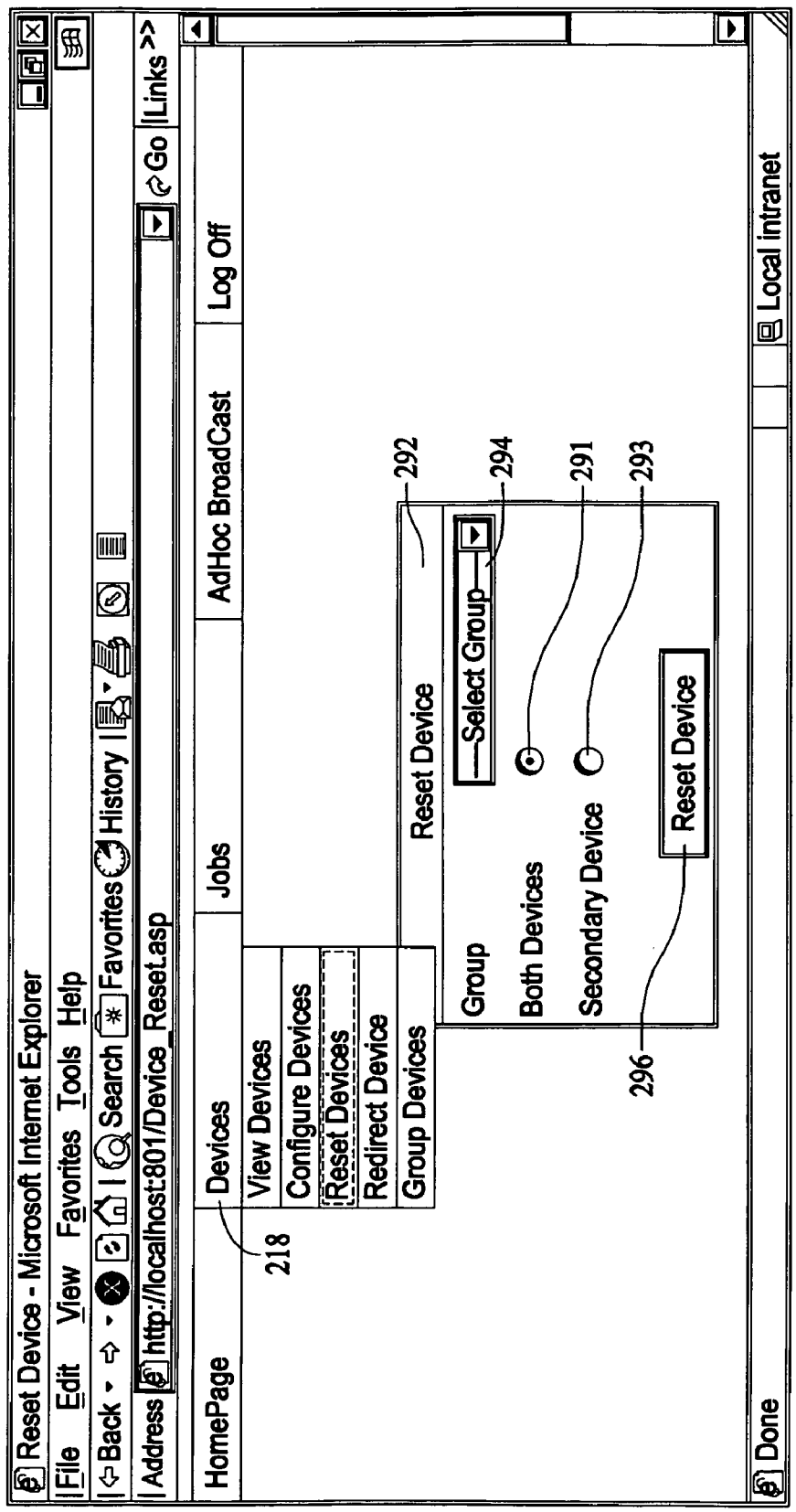
FIG. 9 is an exemplary embodiment of a user interface displaying a reset devices group page within a broadcast user interface manager of the management system.

A device 32 may be reset upon selecting the Reset Devices option from a drop down menu. The drop down menu is displayed upon selection of the Devices menu selection member 218. A user interface 290 is displayed upon selection of the Reset Devices option from the drop down menu. FIG. 9 is an exemplary embodiment of a user interface 290 displaying a reset devices page within the management system 20 (shown in FIG. 1). The user interface 290 includes a reset devices portion 292 having a Device Group field 294, shown in an exemplary embodiment as a pull-down menu, to select device group(s) to be reset. A user may reset both the primary and secondary devices 32 or only the secondary device 32 for a device group by selecting a Both Devices selection member 291 and a Secondary Device selection member 293, respectively. Upon selecting one or more device groups using the Device Group field 294, a user selects the Reset Device selection member 296 to reset the devices 32 configured as part of the device group selected in the Device Group field 294. For example, if a device 32 was previously non-operational for maintenance, the device 32 may be reset and returned to an active state using the user interface 290 after the maintenance is complete. In an exemplary embodiment, the Device Group field 294 shows all device groups that have at least one if its devices 32 in a non-operational state (e.g., down for maintenance), and which may be set to an on-line status and reset.

Figure 10:
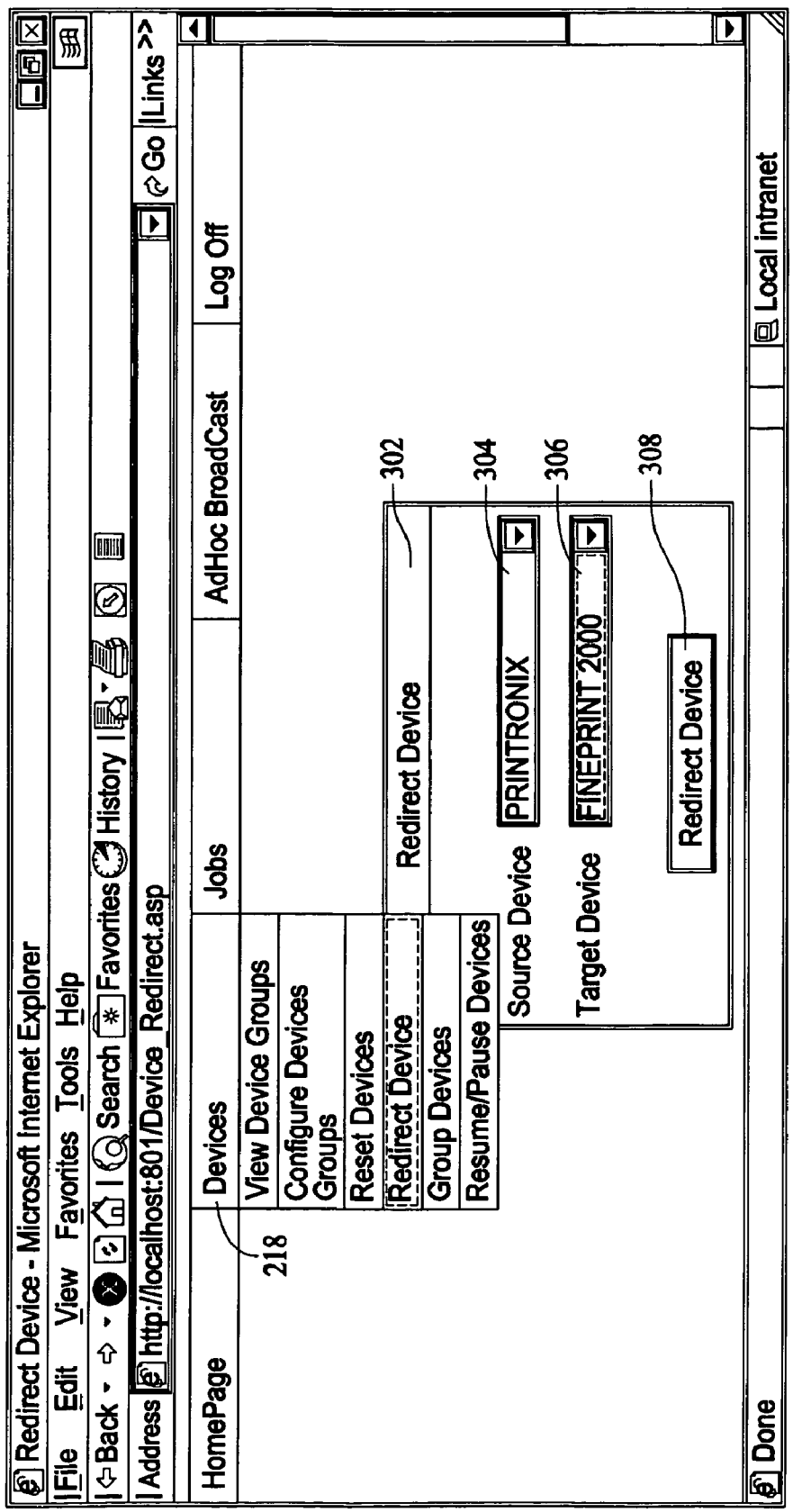
FIG. 10 is an exemplary embodiment of a user interface displaying a redirect devices page within a broadcast user interface manager of the management system.

If a user desires or needs to redirect jobs from one device 32 (shown in FIG. 1) to another device 32 (e.g., if a user knows a device 32 is non-operational), a user may select the Redirect Device option from a drop down menu. The drop down menu is displayed upon selection of the Devices menu selection member 218. A user interface 300 is displayed upon selection of the Redirect Device option from the drop down menu. FIG. 10 is an exemplary embodiment of a user interface 300 displaying a redirect devices page within the management system 20 (shown in FIG. 1). The user interface 300 includes a redirect devices portion 302 having a Source Device field 304 and a Target Device field 306, shown in an exemplary embodiment as pull-down menus, to select a device 32 from which jobs are to be redirected and a device to which the jobs are to be redirected, respectively. Upon selecting source and target devices 32, a user selects the Redirect Device selection member 308 to redirect jobs from the source device 32 to the target device 32. In another exemplary embodiment, a user selects a primary and secondary device, configured using the broadcast system 36 (shown in FIG. 1) in which case, if the primary device of the device group is unavailable (e.g., exceeded queue limit or non-operational), jobs are automatically redirected from the primary device (i.e., source device) to the secondary device (i.e., target device). If one or both of the devices 32 (i.e., primary and secondary devices) are non-operational, then in an exemplary embodiment, a notification is provided to the user as described herein.

Figure 11:
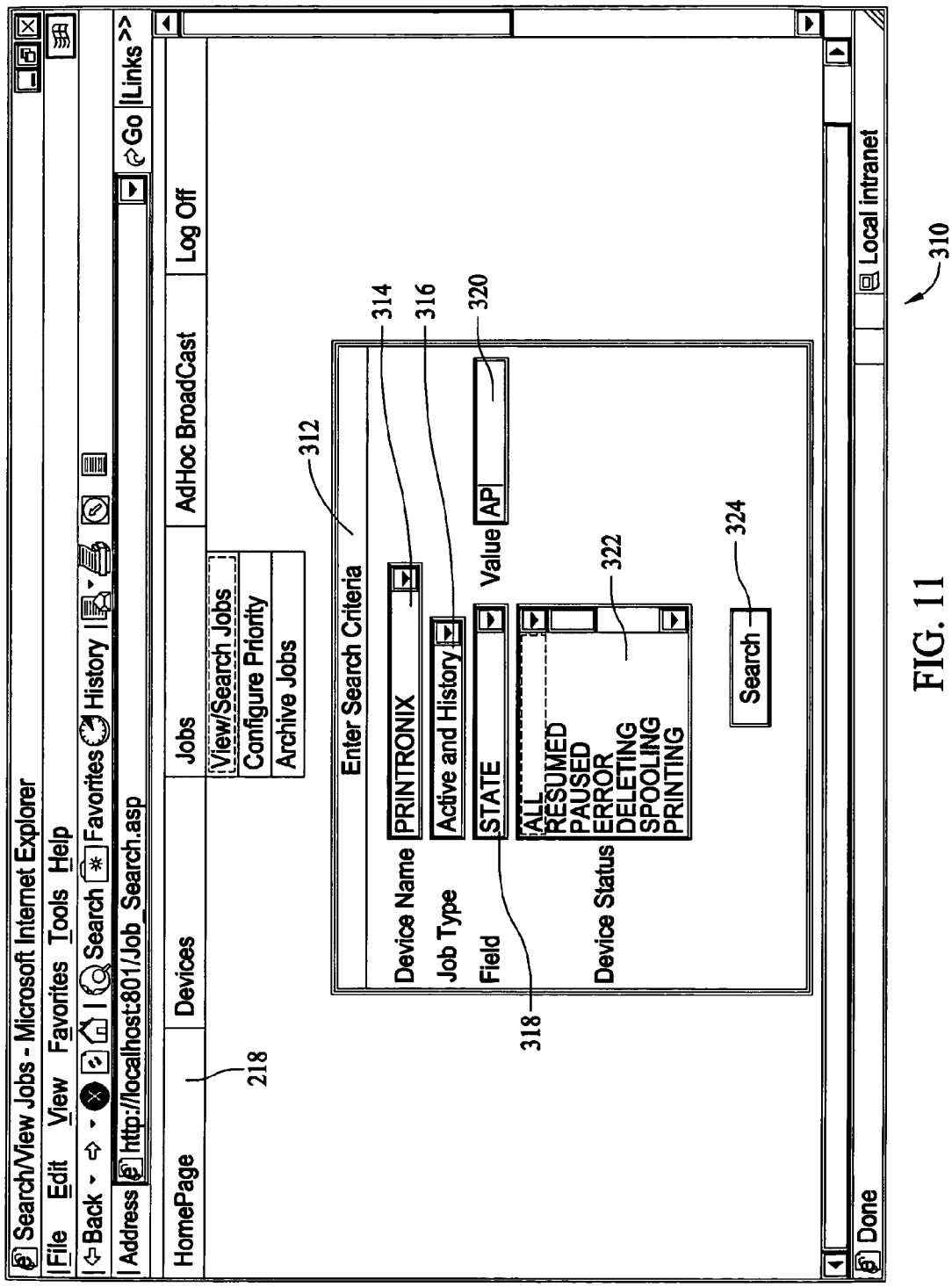
FIG. 11 is an exemplary embodiment of a user interface displaying a view/search page within a broadcast user interface manager of the management system.

A user may search for information relating to the devices 32 (shown in FIG. 1) upon selecting a View/Search Jobs option from a drop down menu. The drop down menu is displayed upon selection of the Jobs menu selection member 218. A user interface 310 is displayed upon selection of the View/Search Jobs option from the drop down menu. FIG. 11 is an exemplary embodiment of a user interface 310 displaying a view/search page within the management system 20 (shown in FIG. 1). The user interface 310 includes a search criteria portion 312 for entering search criteria. Specifically, A Device Name field 314, a Job Type field 316, a Field field 318, a Value field 320 and a Device Status Field 322 are provided. A user may enter a search that is defined based upon one or more devices 32 (shown in FIG. 1) selected from the Device Name field 314 and Job Type field 316, for example, all active jobs, all history jobs, all active and history jobs or all archived jobs in the queues of the devices 32 selected in the Device Name field 314. Using the Field field 318 a user may search for a particular term or item within jobs for the devices 32, which may be user defined as described herein. For example, when used in an automotive application, such as in an automobile manufacturing facility, the Field field 318 may include search terms such as color, VIN number, item ID, etc. Thus, a user may search for jobs having the term "red" therein (e.g., all jobs relating to cars to be painted red), or for a specific VIN number to determine jobs relating to a specific car. Using an Item ID, and for example, a user may search for particular tasks using predetermined task codes. After entering search criteria in one or more of the fields in the search criteria portion 312, a user selects a Search activation member 324. It should be noted that other functionality might be selected from the Jobs menu selection member 218, such as, for example, a Configure Priority option to configure job priorities in the queues of the devices 32 and an Archive Jobs option to archive and store a list of jobs that have been performed. User interfaces may be provided accordingly and as described herein.

Figure 12:
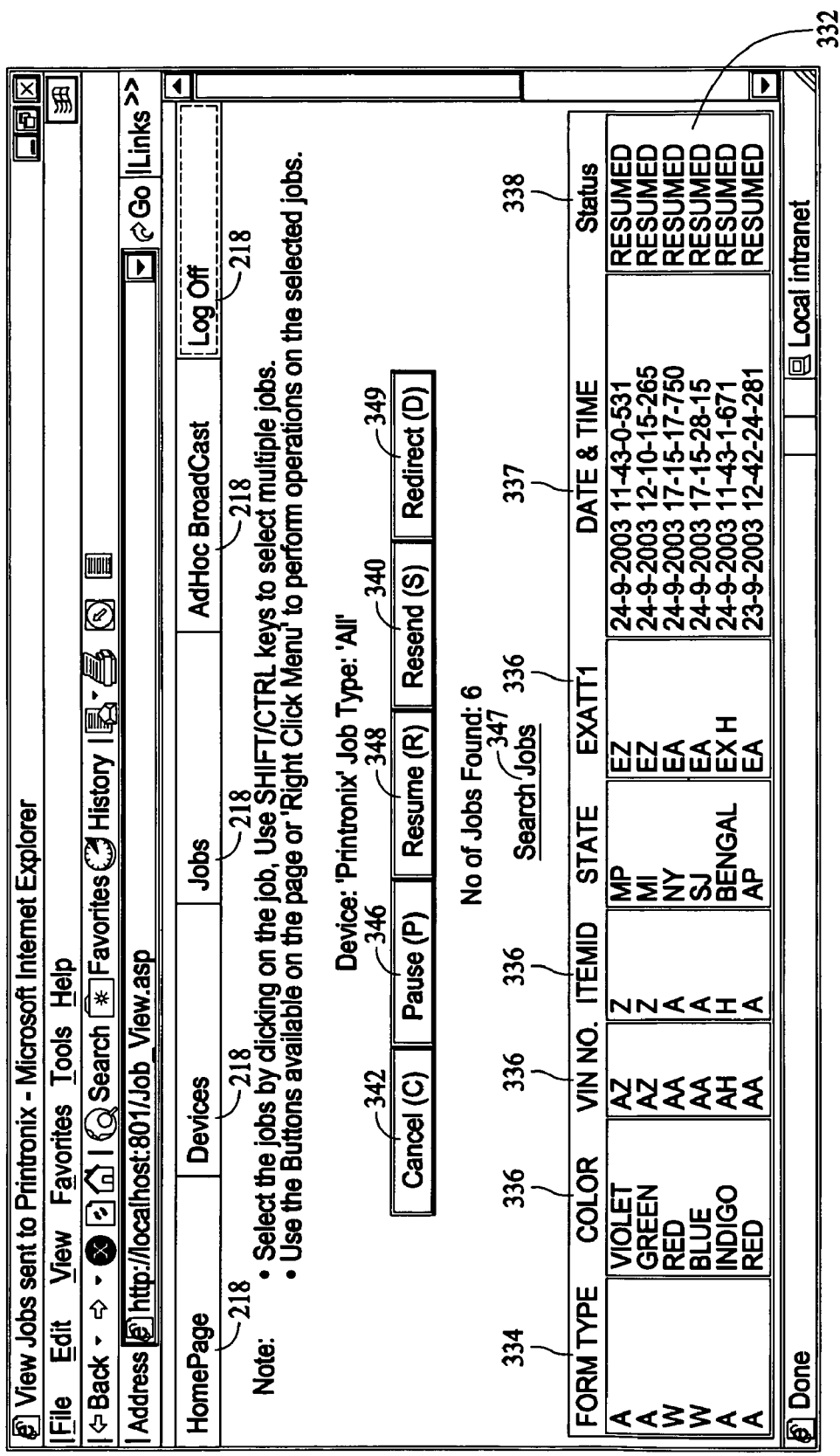
FIG. 12 is an exemplary embodiment of a user interface displaying a search results page within a broadcast user interface manager of the management system.

Search results are provided by a user interface 330. FIG. 12 is an exemplary embodiment of a user interface 330 displaying a search results page within the management system 20 (shown in FIG. 1). The user interface 330 includes a search results portion 332 for viewing the results of a search defined using the user interface 310 (shown in FIG. 11). Specifically, the search results portion 332 includes a Form Type column 334, a plurality of user definable job track columns 336 (e.g., Color, VIN No., Item ID, State, Exattl, etc.), a Date and Time column 337 and a Status column 338. The Form Type column 334 identifies the type of form for each of the specific jobs resulting from the search, which may include, for example, displaying A for an ASCII form and displaying W for a What You See Is What You Get (WYSIWYG) form. The job track columns 336 identify information for each of jobs resulting from the search, and may include, for example, when used in an automotive application, such as in an automobile manufacturing facility, a color column identifying the color of a vehicle resulting from the search, an item identification column identifying an identification number (e.g., internal identification codes) for the vehicle, and a state column identifying the delivery state for the vehicle. Additional columns for displaying results relating to user defined tracking codes or indications also may be provided (e.g., VIN No. column and EXAT1 column). A user may define a search based upon criteria represented by each of the job track columns 336 using the Field field 318 (shown in FIG. 11). In an exemplary embodiment, the Field field 318 includes as a separate search term corresponding to information relating to each of the job track columns 336 for use in defining a search.

Figure 16:
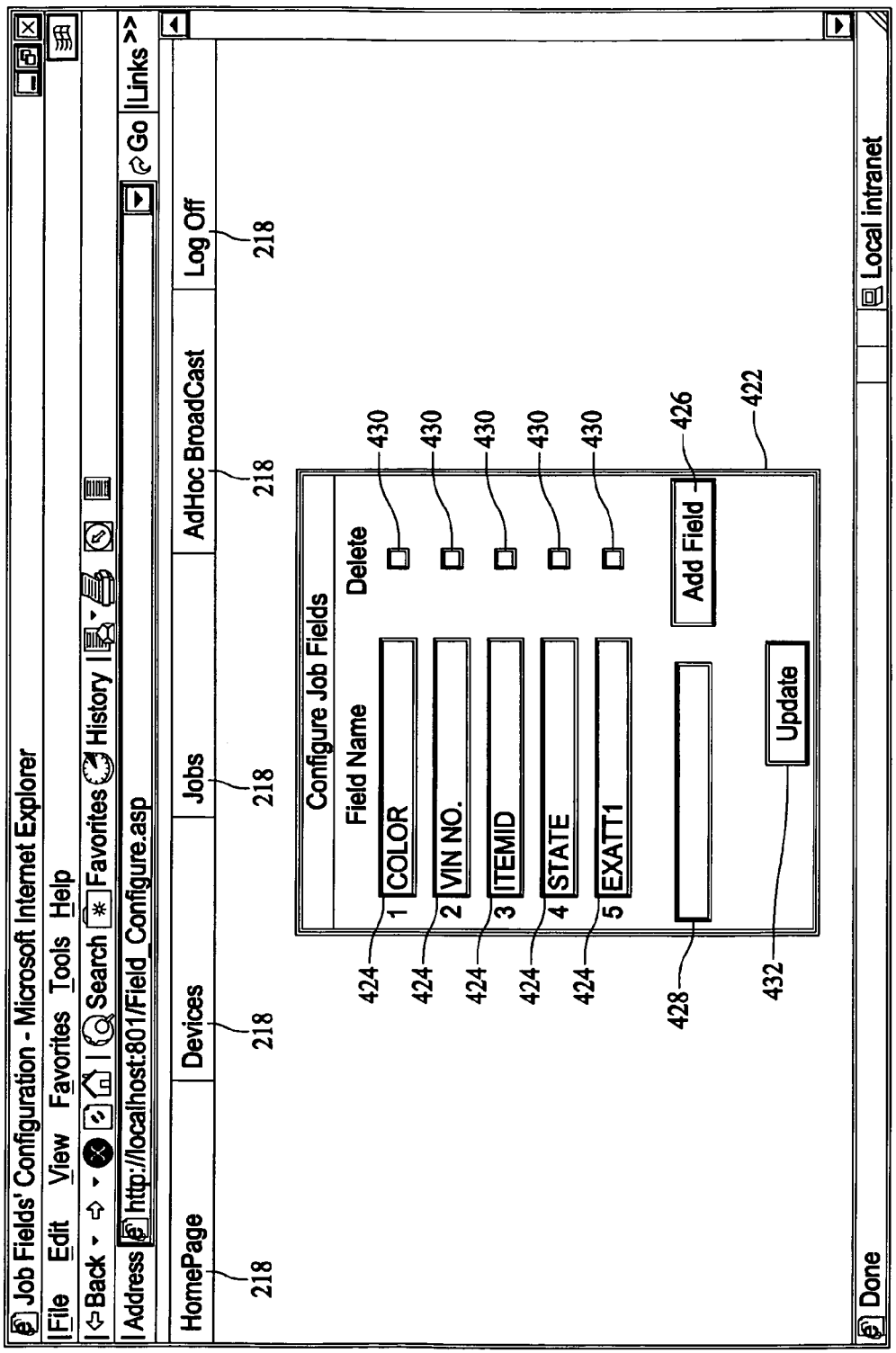
FIG. 16 is an exemplary embodiment of a user interface displaying a configure job track page within a broadcast user interface manager of the management system.

The job track columns 336 may be defined using a user interface 420, an exemplary embodiment of which is shown in FIG. 16. The user interface 420 displays a configure job track page within the management system 20 (shown in FIG. 1). The user interface 420 includes a Configure Jobs Field portion 422 for defining the job track columns 336 (shown in FIG. 12). The Configure Job Fields portion 422 includes a plurality of field name fields 424 for defining each of the job track columns 336. For example, a user may enter the categories or names for each of the job track columns 336, such as Color, A1, ItemID, State and Exatt1. Additional field name fields may be entered and defined using an Add Field selection member 426 with the field name entered in field 428. One ore more fields defined in the Field name fields 424 may be deleted upon selecting a Delete selection member 430 (e.g., selectable box). An Update selection member 432, when selected, updates the job track columns 336 (e.g., names for each of the columns). In an exemplary embodiment, the search terms in the Field field 318 (shown in FIG. 11) are also updated.

Referring again to user interface 330 shown in FIG. 12, the Date and Time column 337 identifies the date and time the job, for example, corresponding to a required form, was initiated, resumed, completed, etc. The Status column 338 identifies the status for each job of the search results. In one exemplary embodiment, each row in the search results portion 332 represents a different job.

The user interface 330 also includes a Cancel selection member 342 for canceling a job, a Pause selection member 346 for pausing a job, a Resume selection member 348, for resuming a job (e.g., resuming a paused job), a Resend selection member 340 for resending (e.g., resending a job or control command to a device 32) and a Redirect selection member 349 for redirecting a job from one device 32 to another device 32. A user may, for example, select one or more jobs in the search results portion 332, and thereafter click a selection member with the corresponding operation performed on the selected jobs. Other selection members may also be provided, for example, a Get Jobs selection member (not shown) for obtaining additional information relating to one or more jobs, for example, from the device 32 associated with the job, and a Search Jobs selection member 347 for performing another search or refining an existing search.

Figure 13:
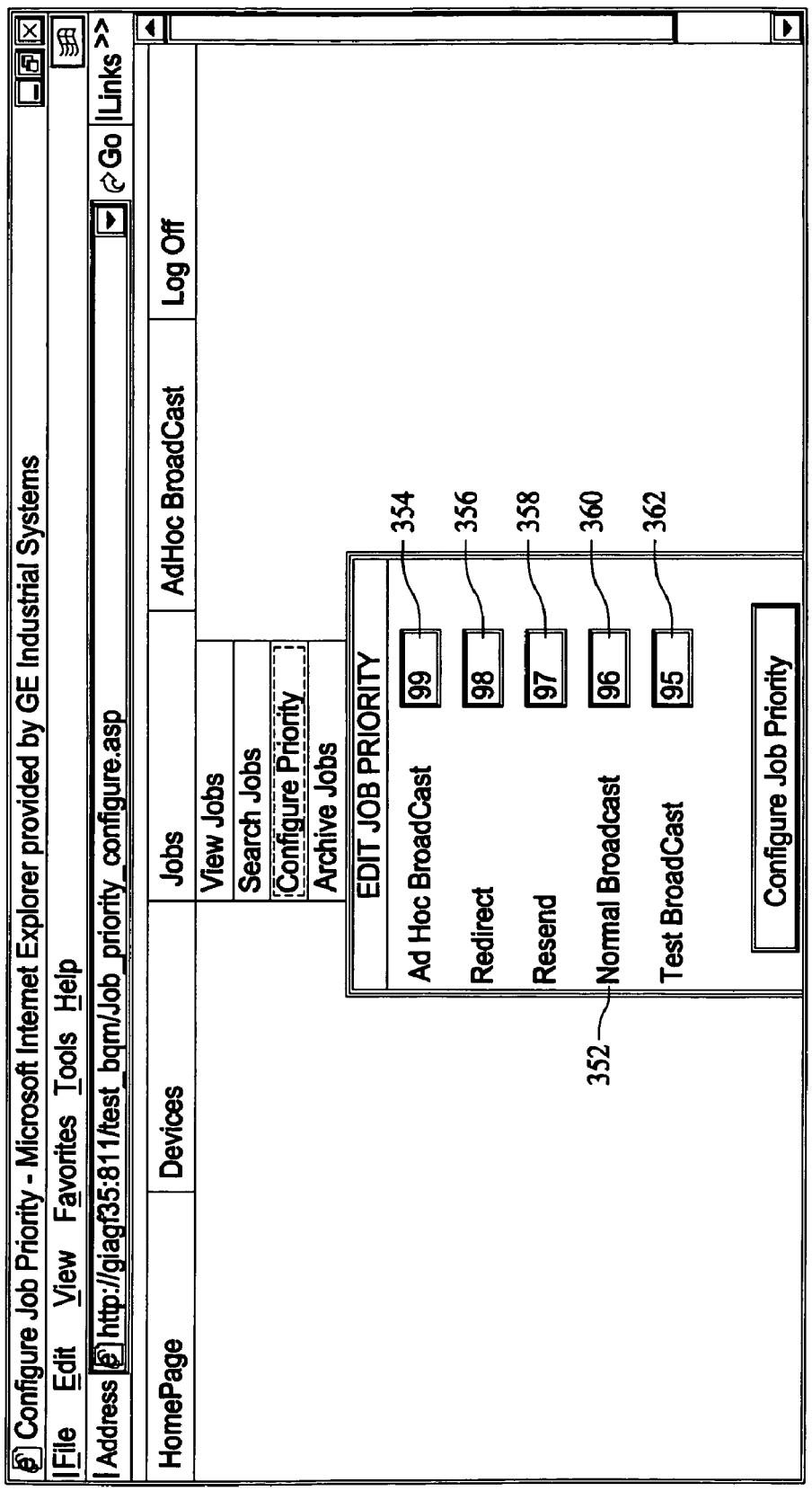
FIG. 13 is an exemplary embodiment of a user interface displaying a configure priority page within a broadcast user interface manager of the management system.

A user may set a priority for broadcasts to the devices 32 (shown in FIG. 1) upon selecting a Configure Priority option from a drop down menu. The drop down menu is displayed upon selection of the Jobs menu selection member 218. A user interface 350 is displayed upon selection of the Configure Priority option from the drop down menu. FIG. 13 is an exemplary embodiment of a user interface 350 displaying a configure priority page within the management system 20 (shown in FIG. 1). The user interface 350 includes an edit job priority portion 352 for setting or modifying the broadcast priorities performed by the management system 20. Specifically, an Ad Hoc Broadcast field 354, a Redirect field 356, a Resend field 358, a Normal Broadcast field 360 and a Test Broadcast field 362 are provided for setting a priority level for each of the corresponding broadcasts. In an exemplary embodiment, the higher the priority value, the higher the priority of the broadcasts of that type (e.g., higher priority broadcasts performed before lower priority broadcasts). Default values for the priorities initially may be provided. A user then may select a Configure Job Priority selection member 364 to set the job priorities for the broadcasts. It should be noted that additional or different fields may be provided as needed or desired.

Figure 14:
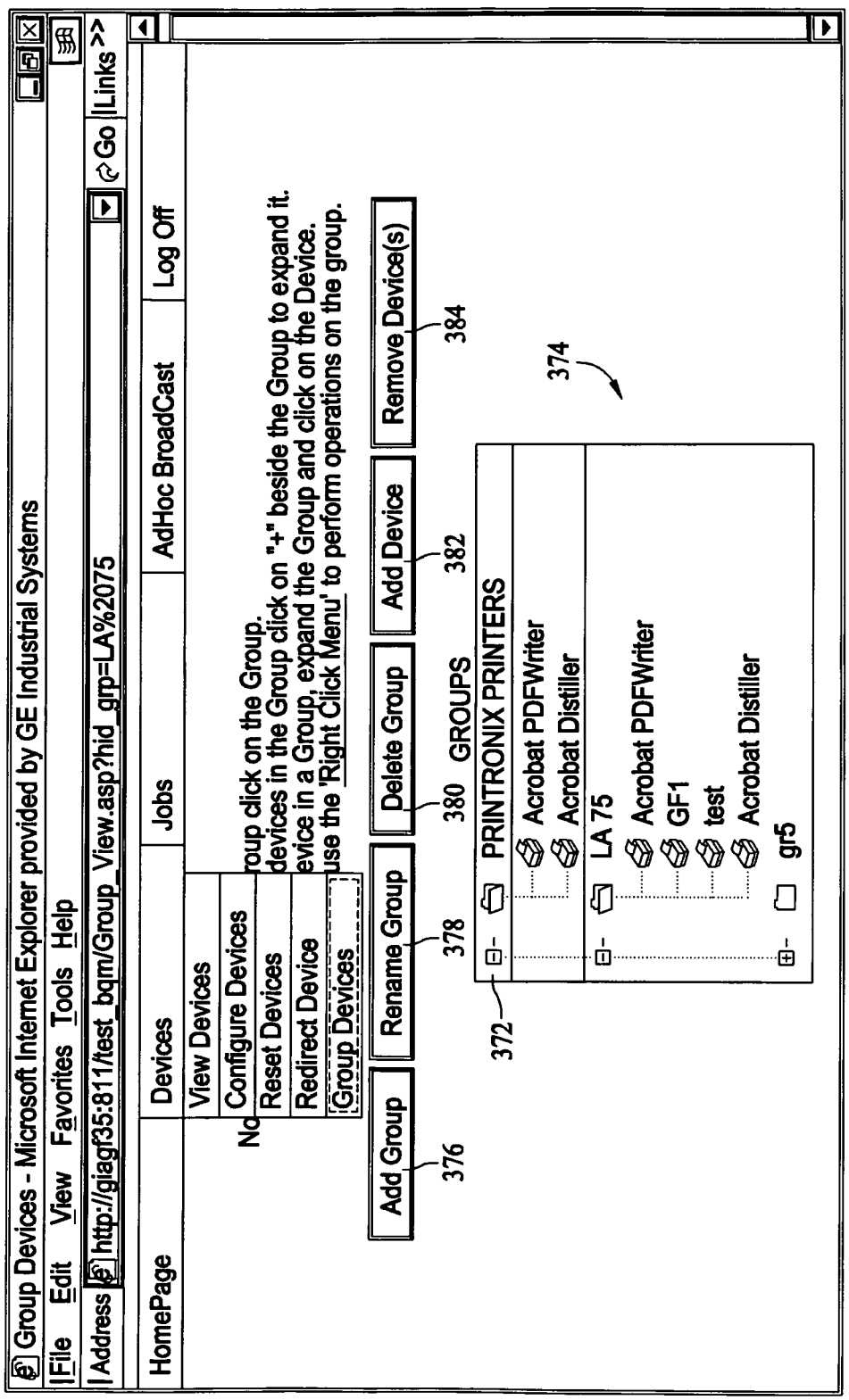
FIG. 14 is an exemplary embodiment of a user interface displaying a group devices page within a broadcast user interface manager of the management system.

A user may group devices 32 (shown in FIG. 1) such that a broadcast (e.g., an adhoc broadcast) is sent to a plurality of grouped devices 32 upon selecting a Group Devices option from a drop down menu. The drop down menu is displayed upon selection of the Devices menu selection member 218. A user interface 370 is displayed upon selection of the Group Devices option from the drop down menu. FIG. 14 is an exemplary embodiment of a user interface 370 displaying a group devices page within the management system 20 (shown in FIG. 1). The user interface 370 includes a device-grouping portion 372 for grouping devices 32 (shown in FIG. 1). For example, in an exemplary embodiment, if the available devices 32 are printers, then a list 374 of printers will be displayed. A user may then select one or more printers to group together. Thereafter, a user may select an Add Group selection member 376 to create a device group based upon the selected devices 32, a Rename Group selection member 378 to rename an existing group, a Delete Group selection member 380 to delete an existing group, an Add Device selection member 382 to add a device 32, for example, to an existing group and a Remove Device(s) selection member 384, to remove a device 32, for example, from an existing group.

Figure 15:
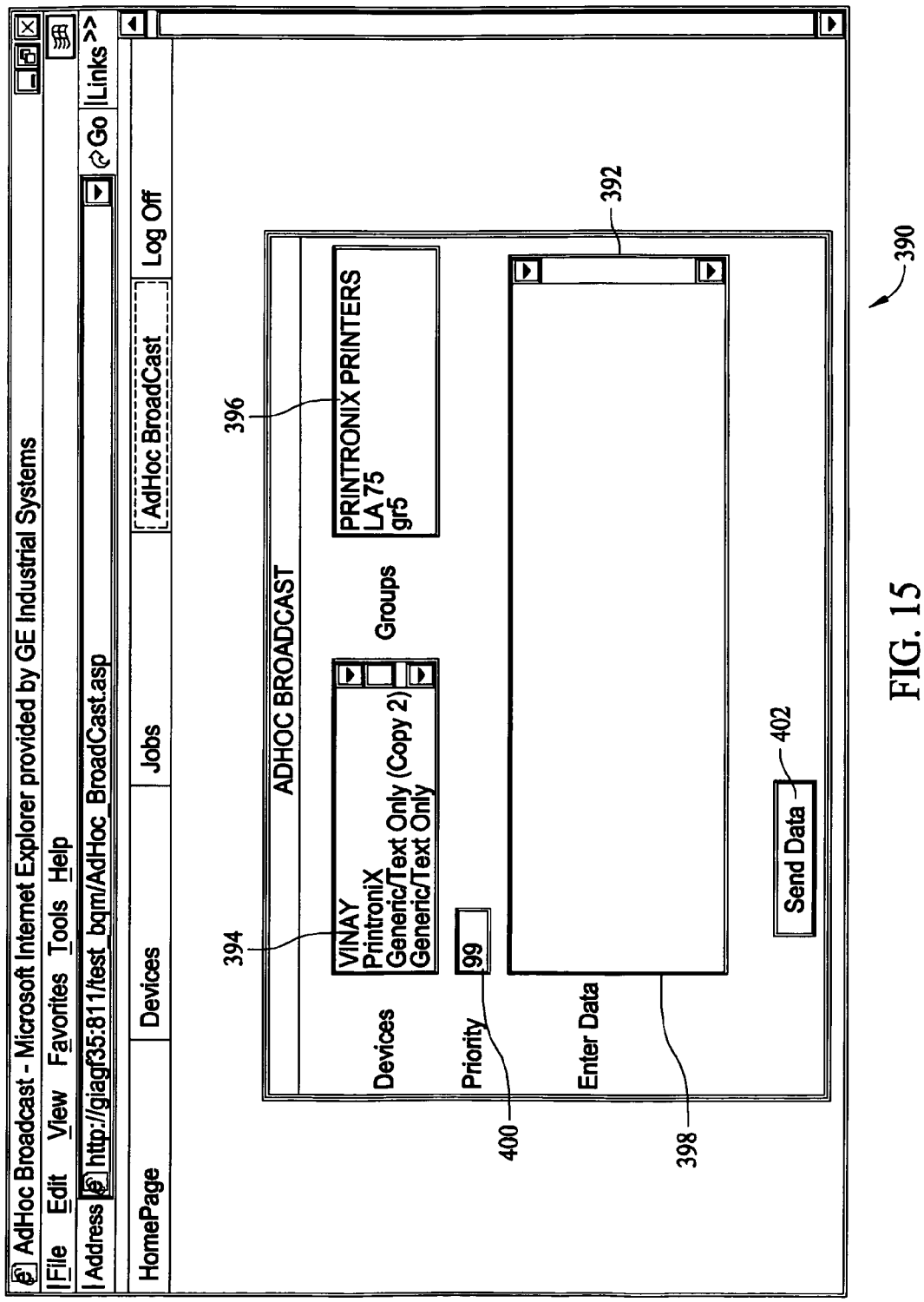
FIG. 15 is an exemplary embodiment of a user interface displaying an adhoc broadcast page within a broadcast user interface manager of the management system.

A user may then view grouped devices 32 (shown in FIG. 1) and select data or commands to be broadcast to one or more groups upon selecting the AdHoc Broadcast menu selection member 218. A user interface 390 is displayed upon selection of the AdHoc Broadcast menu selection member 218. FIG. 15 is an exemplary embodiment of a user interface 390 displaying a broadcast page within the management system 20 (shown in FIG. 1). The user interface 390 includes a broadcast portion 392 for selecting groups to which data and/or commands are to be broadcast and for viewing devices 32 within each of the groups. Specifically, a Devices field 394, a Groups Field 396, an Enter Data field 396 and a Priority field 400 are provided. A user may select groups in the Groups field 396 to which data and/or commands are to be broadcast. The corresponding devices 32 (shown in FIG. 1) for each of the selected groups are identified in the Devices field 394. The user may limit the devices 32 within the group to which the broadcast will be sent, by selecting specific devices 32 displayed within the Devices field 394. A user then enters, for example, data (e.g., ASCII text) to be broadcast using the Enter Data field 398. A user may also set a priority level for the broadcast using the Priority field 400. A user selects a Send Data selection member 402 to broadcast the data to the selected groups as determined in the broadcast portion 392.

Figure 18:
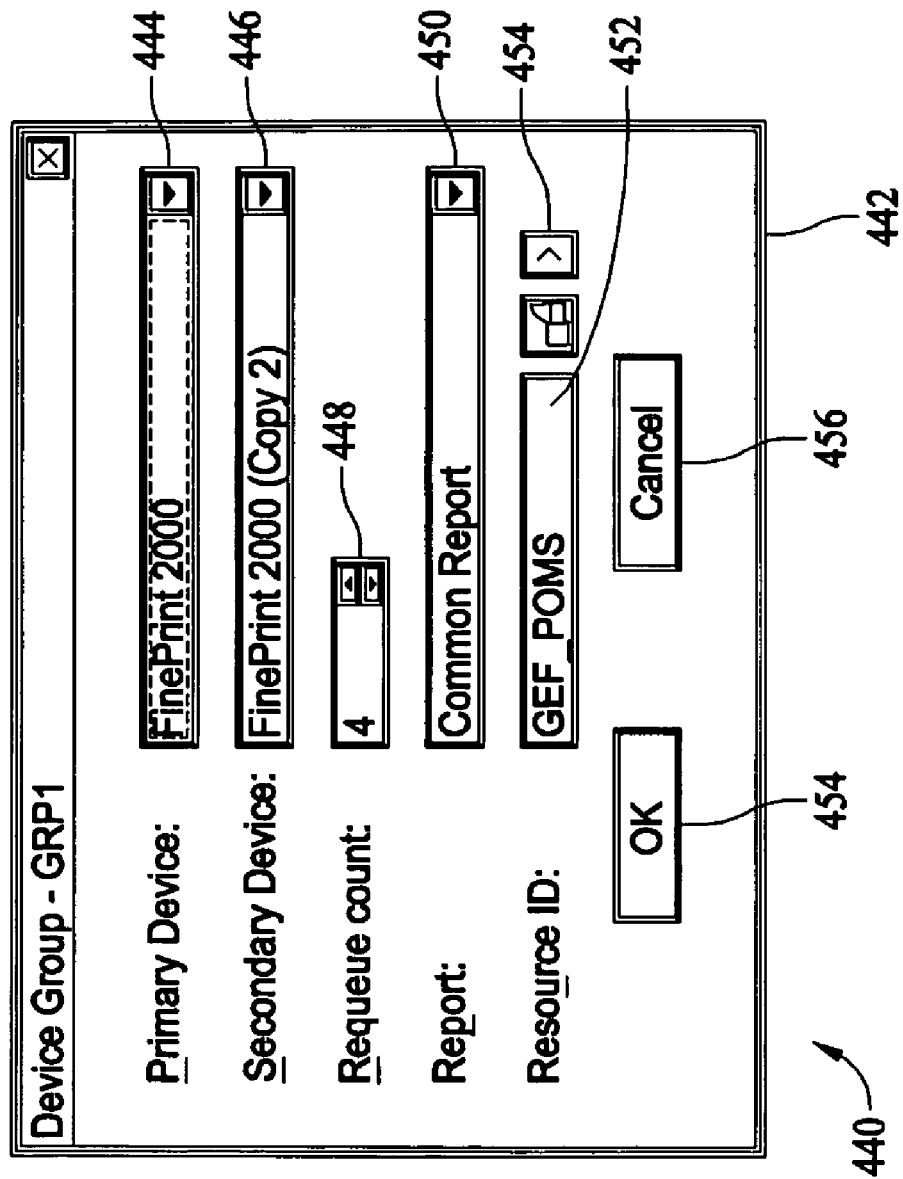
FIG. 18 is an exemplary embodiment of a user interface displaying a device group configuration page within a broadcast user interface manager of the management system.

A user may configure device with a user interface 440 as shown in FIG. 18. The user interface may be displayed as a separate page or as, for example, a pop-up portion on another user interface. The user interface 440 may be selected from other user interfaces, for example, by selecting a s specific group to be configured. The user interface 440 displays a device group configuration page within the management system 20 (shown in FIG. 1). The user interface 440 includes a device group configuration portion 442 for configuring a selected device group (e.g., GRP1). The device group configuration portion 442 includes a Primary Device field 444 and a Secondary Device field 446 for selecting a primary and secondary device, respectively, for the device group. The device group configuration portion 442 also includes a Requeue count field 448 for defining a requeue count, a Report field 450 for defining a report (e.g., common report) associated with the device group, and a Resource ID field 552 for defining a resource identification for the device group. A forward selection member 454 may be selected to display additional resource identification names in the Resource ID field 452. A user may configure the device group based upon the selected devices 32 shown in the Primary Device field 444 and Secondary Device field 446 by selecting an OK selection member 454. A user may cancel the configuration by selecting a Cancel selection member 456.

A user may log off of the management system 20 by selecting the Log Off menu selection member 218. Selecting this selection member 218 logs a user off of the management system 20 and closes any current sessions.

Thus, in operation, a user using the management system 20 and user interfaces may monitor and manage a plurality of devices 32, for example, within a network and configured as a plurality of device groups. The management system 20 alerts a user when a condition has been exceeded (e.g., a job queue limit has been exceeded) to facilitate monitoring the plurality of devices 32. Further, a user may manage (e.g., configure) the plurality of devices 32 with a single system manager, and in particular, the broadcast user interface manager 22 as described herein. Jobs for each of the devices 32 are managed with a virtual queue (e.g., a file stored in a device memory). A plurality of different devices 32 having different communication protocols and driver requirements may be controlled from the single system manager. For example, a user may log on to the management system 20 using the user interface 200 (shown in FIG. 4). Thereafter, a user may set queue limits for each of the plurality of devices 32 with the user interfaces 220 and 250 (shown in FIGS. 6 and 7). Once the queue limits are set, the management system provides notification, such as displaying an alarm message that identifies the device(s) 32 exceeding the queue limit. A user may also control the operations of the devices 32, such as, for example, redirecting, pausing, canceling, or otherwise modifying jobs to be performed by specific devices 32. A user may also set priorities for broadcasts as desired or needed. A user further may define the categories of information relating to the jobs that are tracked using the user interface 420 (shown in FIG. 16), which also may be searched using the user interface 310 (shown in FIG. 11) with the search result displayed by user interface 330 (shown in FIG. 12).

Thus, the management system 20 may be used to control a plurality of devices 32, for example, in an automobile manufacturing facility. In such a case, at certain points within the manufacturing process, specific events are automatically triggered, for example, certain forms are to be printed at specific printers or information sent to particular displays upon occurrence of the triggering event. Using the management system 20 with a single system manager (e.g., the broadcast user interface manager 22), a user may, for example, configure the location where forms are to be printed or displayed upon a triggering event and monitor the status of the performance of the printing or displaying. Further, and for example, using predefined commands, a user may cause certain forms to be populated with information and sent to specific devices 32. A user also may define the information or jobs to be monitored. Global configuration for device groups is also provided. The management system 20 also allows, for example, for redirecting a specified number of jobs from one device 32 to another 32 if the device becomes inoperable. The various exemplary embodiments thereby provide monitoring and management of systems having a plurality of devices.

While the invention has been described in terms of various specific embodiments, those skilled in the art will recognize that the invention can be practiced with modification within the spirit and scope of the claims.

What is claimed is:

1. A network-based management system for managing a plurality of network devices, said system comprising:
    a database; and
    a computer coupled to the database and the plurality of network devices, said computer comprising:
    a user interface for controlling operation of the plurality of network devices, the plurality of network devices having corresponding device drivers to configure each of the plurality of network devices to allow queuing operations to be performed in connection with the plurality of network devices, said user interface configured to communicate with the plurality of network devices to identify and control jobs in a queue relating to each of the plurality of network devices, said user interface configured to at least one of pause, reset, resume, cancel, resend, and redirect jobs, said user interface further configured to search for jobs within the plurality of network devices based on user defined search criteria, said user interface further configured to limit access to control operations for controlling the plurality of network devices based upon user login information;
    a monitoring system for monitoring the plurality of network devices, said monitoring system configured to access the database to retrieve stored queue limits relating to each of the plurality of network devices, to poll each of the plurality of network devices to determine a number of jobs in each queue, and to provide notification to said user interface when the stored queue limit for at least one of the plurality of network devices is exceeded, wherein the stored queue limit comprises at least one value, defined based on a user input, representing a job limit for the associated network device; and
    a device interface for interfacing with the plurality of network devices to allow communication between said user interface and the plurality of network devices, said device interface configured to communicate with the corresponding device drivers for each of the plurality of network devices.

2. A system in accordance with claim 1 wherein the queue limit comprises a print queue limit.

3. A system in accordance with claim 1 wherein said user interface is configured to redirect jobs from one network device to another network device.

4. A system in accordance with claim 1 wherein said user interface is configured to assign a priority to jobs transmitted to the plurality of network devices.

5. A system in accordance with claim 1 wherein said user interface is configured for web-based operation.

6. A system in accordance with claim 1 wherein the queuing operations are performed using a virtual queue.

7. A system comprising a broadcast manager for controlling a plurality of network devices within a network, each network device comprising a queue, said system comprising:
    a computer device;
        a user login component on the computer device to allow access to the plurality of network devices and a configuration database, the plurality of network devices having corresponding device drivers to configure each of the plurality of network devices to allow queuing operations to be performed in connection with the plurality of network devices, the configuration database configured to store user defined queue limits relating to the plurality of network devices, the stored queue limits comprising a plurality of values representing job limits for the plurality of network devices;
        a network device configuring component to configure each of the plurality of network devices, said network device configuring component having queue limit fields for each of the plurality of network devices;
        a queue limit control component to control user access to the configuration database based upon user login information provided to said user login component;
        a search component to search for jobs within each of the plurality of network devices based on user defined search criteria;
        a job control component to control the operation of each of the plurality of network devices, said job control component configured to at least one of pause, reset, resume, cancel, terminate, resend, and redirect jobs;
        a monitoring component to poll each of the plurality of network devices to determine a number of jobs in each queue;
        a notification component to provide notification when the queue limit for one of the plurality of network devices is exceeded; and
        a privileges component to limit access to the configuration database and said job control component based on user login information provided to said user login component.

8. A system in accordance with claim 7 further comprising a virtual queue for performing queuing operations.

9. A system in accordance with claim 7 further comprising a priority component to set a priority for jobs to control the operation of the plurality of network devices.

10. A system in accordance with claim 9 further comprising a grouping component to group some of the plurality of network devices to which commands are broadcast.

11. A system in accordance with claim 7 further comprising a broadcast component to broadcast at least one of data and commands to at least one of the plurality of network devices.

12. A method for managing a plurality of network devices within a network, said method comprising:
    interfacing with the plurality of network devices to allow communication between a user interface and the plurality of network devices;
    determining user access to the plurality of network devices based upon user login information;
    controlling access to a control operation for controlling the plurality of network devices based on the user login information, wherein the control operation includes at least one of pausing, resetting, resuming, canceling, resending, and redirecting jobs;

configuring each of the plurality of network devices, using corresponding device drivers, to allow queuing operations to be performed in connection with the plurality of network devices;

storing a job queue limit for each of the plurality of network devices in a database, the job queue limit comprising a value representing a job limit for each of the plurality of network devices;

defining a plurality of search criteria to search for jobs within the job queues;

searching for jobs within the job queues based upon the search criteria;

polling each of the plurality of network devices to determine a number of jobs in each job queue;

determining whether the job queue limit associated with the network device is exceeded;

providing notification to the user interface when the job queue limit is exceeded; and modifying the job queue limit for at least one of the plurality of network devices based upon a user input.

13. A method in accordance with claim 12 further comprising determining user access to the plurality of network devices based upon user login information.

14. A method in accordance with claim 12 further comprising broadcasting commands to the plurality of network devices to control operation of at least one of the plurality of network devices.

15. A method in accordance with claim 14 wherein said broadcasting commands comprise transmitting the commands to the plurality of network devices based upon user defined priority levels.

16. A method in accordance with claim 12 further comprising redirecting jobs from one network device to another network device based upon user inputs.

17. A method in accordance with claim 12 further comprising assigning jobs to each of the plurality of network devices based on the job queue limits.

18. A method in accordance with claim 12 further comprising communicating with the plurality of network devices via an interface.

* * * * *